March 3, 1953
J. M. FERGUSON
2,630,148
RECIPROCATING SAW
Filed April 6, 1949
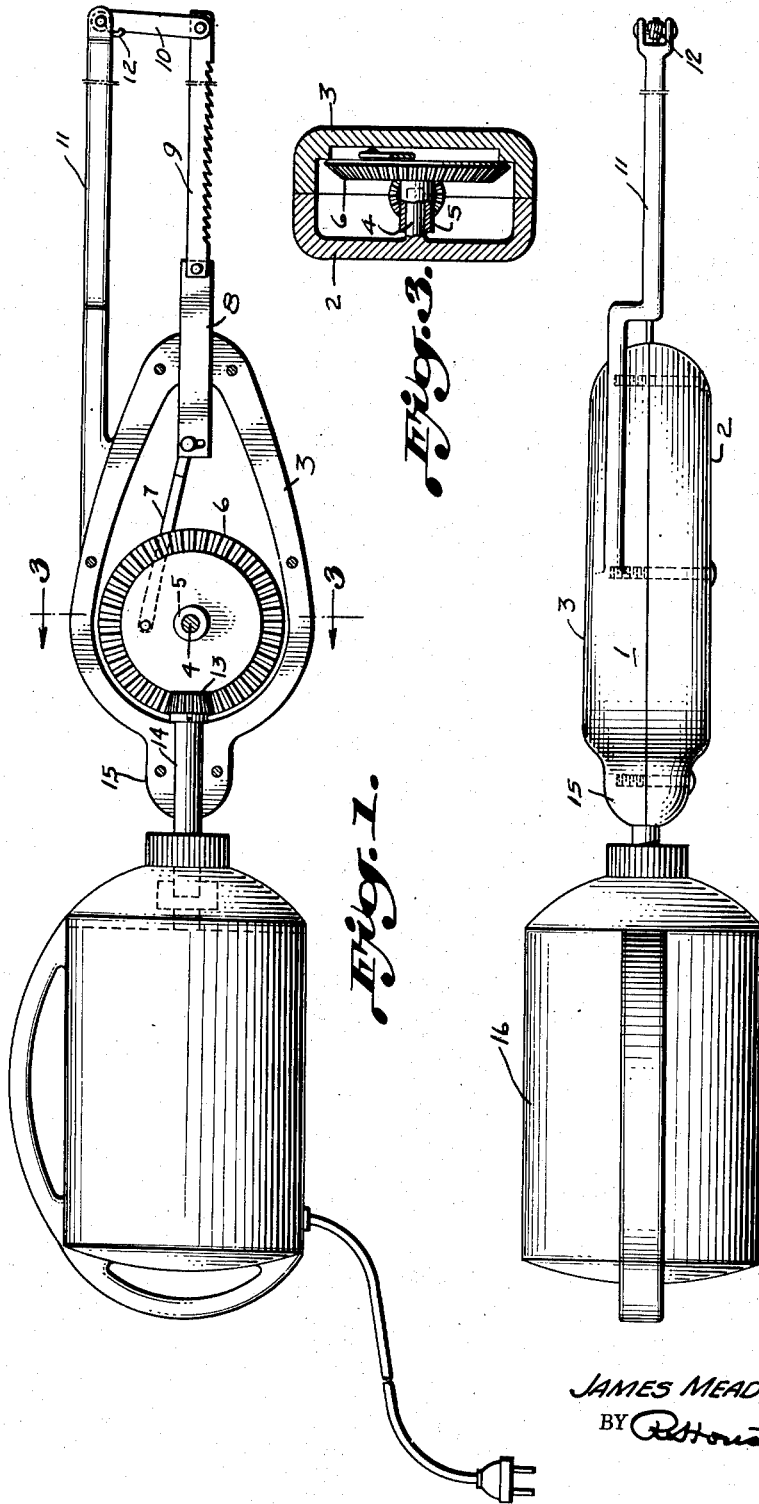
INVENTOR.
JAMES MEADE FERGUSON
BY
ATTORNEY Patented Mar. 3, 1953

2,630,148

UNITED STATES PATENT OFFICE 2,630,148

RECIPROCATING SAW

James Meade Ferguson, Richmond, Va.

Application April 6, 1949, Serial No. 85,851

2 Claims. (Cl. 143—68)

This invention relates to a reciprocating saw for a power tool, and more particularly to such a device which may be adapted to fit the usual and standard electric motor power driven tool.

One of the objects of this invention is the provision of a saw adapted to be used in operative relation with an electric power tool.

Another object of this invention is the provision of a saw adapted for securement to an electric power tool in detachable fashion.

A further object of this invention is the provision of a saw for attachment to a power tool which actuates said saw in reciprocal fashion.

Other objects and features will more fully appear from the following description and accompanying drawings, in which:

Fig. 1 is a sectional side view of the invention;

Fig. 2 a top plan view; and

Fig. 3 a sectional view along lines 3—3 of Fig. 1 looking in the direction of the arrows.

Referring to the drawings, a casing 1 is divided into sections 2—3. An axle 4 projects from section 2 and has disposed thereon in rotatable fashion a bearing 5 connected to a beveled gear 6. A pitman or throw rod 7 has one of its ends pivotally connected to the back of gear 6 and the other of its ends connected in slot-like fashion to a link 8. The link is substantially disposed in the end of casing 1 and mounted in slidable fashion therein, and has its free end projecting therefrom.

Attached to the free end of link 8 is one end of a saw blade 9; the latter having its other end connected to a bar 10 which is pivotally mounted to a support 11 secured to section 3 of the casing. A spring 12 causes the bar to tend to move away from the casing thereby forcing the blade in that direction to maintain a tension in that direction.

A pinion 13 meshes with gear 6 and has an axle 14 journaled in a bearing 15 formed by sections 2—3 of casing 1. The axle 14 extends from the casing and is adapted to be connected to an electric motor power tool 16 in a fashion well known to the art.

The device functions as follows: When the motor in tool 16 is electrically actuated the axle 14 connected to the motor shaft revolves the pinion which turns gear 6 thereby actuating throw rod 7 which reciprocates link 8 that moves the saw blade back and forth against the tension of bar 10.

It is obvious from the foregoing that the attachment is simple in construction, easily assembled and may be attached to any standard power tool in the same manner as a bit or other power tool attachments.

Having described this invention, what is claimed is:

1. In a device of the character described, consisting of a casing provided with an axle secured to one of its sides; a gear mounted on said axle in rotatable fashion and housed in the other side of said casing; a pinion meshing with said gear and having an axle journaled in one end of said casing and projecting therefrom for connection with a power tool; a throw rod having one of its ends connecting said gear and a link mounted in the other end of said casing and having one of its ends connecting the other end of said rod; a saw blade having one of its ends connected to the other end of said link, and the other end to a bar, and means projecting from said casing for supporting said bar in pivotal fashion; and a source of power for operating said mechanism.

2. In a device of the character described consisting of a casing formed by two sections; an axle integral with and projecting from one section of said casing; a beveled gear mounted on said axle and housed in the other section; a pinion meshing with said gear and being provided with an axle journalled in a bearing in one end of said casing for external engagement and disengagement with a power tool; a support mounted on one of said sections and having a bar pivoted on its end; a link slidable in a bearing in the other end of said casing; a throw rod connecting said gear and one end of said link, and a saw blade having one of its ends pivotally connecting the other end of said link and the other of its ends pivotally connecting said bar.

JAMES MEADE FERGUSON.

REFERENCES CITED

The following references are of record in the file of this patent:

UNITED STATES PATENTS

| Number | Name | Date |
|---|---|---|
| 1,542,127 | Hastings | June 16, 1925 |
| 1,617,410 | Meyer | Feb. 15, 1927 |
| 1,726,772 | Skowron | Sept. 3, 1929 |
| 1,793,053 | Cahill et al. | Feb. 17, 1931 |